United States Patent
Dooley et al.

(10) Patent No.: US 7,539,276 B2
(45) Date of Patent: May 26, 2009

(54) METHOD OF PROCESSING A SAMPLED SPREAD SPECTRUM SIGNAL STREAM

(75) Inventors: Saul R. Dooley, Horley (GB); Andrew T. Yule, East Grinstead (GB)

(73) Assignee: NXP B.V., Eindhoven (NL)

( * ) Notice: Subject to any disclaimer, the term of this patent is extended or adjusted under 35 U.S.C. 154(b) by 605 days.

(21) Appl. No.: 10/567,208

(22) PCT Filed: Jul. 30, 2004

(86) PCT No.: PCT/IB2004/002576

§ 371 (c)(1),
(2), (4) Date: Feb. 3, 2006

(87) PCT Pub. No.: WO2005/015255

PCT Pub. Date: Feb. 17, 2005

(65) Prior Publication Data

US 2006/0203887 A1    Sep. 14, 2006

(30) Foreign Application Priority Data

Aug. 6, 2003    (GB) .................................. 0318386.0

(51) Int. Cl.
H04L 7/00    (2006.01)
(52) U.S. Cl. ........................ 375/355; 375/147; 341/113; 341/131; 455/182.2; 455/192.2

(58) Field of Classification Search ................. 375/147, 375/149, 344, 354, 355; 341/126, 113, 131; 455/37.11, 13.4, 182.1, 182.2, 192.1, 192.2
See application file for complete search history.

(56) References Cited

U.S. PATENT DOCUMENTS

| | | | |
|---|---|---|---|
| 5,268,927 A | 12/1993 | Dimos et al. | |
| 6,219,376 B1* | 4/2001 | Zhodzishsky et al. | ........ 375/148 |
| 6,442,193 B1* | 8/2002 | Hirsch | .......... 375/147 |
| 6,504,863 B1* | 1/2003 | Hellmark | ..... 375/219 |
| 6,532,370 B1* | 3/2003 | Underbrink et al. | ...... 455/552.1 |
| 6,693,953 B2* | 2/2004 | Cox et al. | ................... 375/141 |
| 6,980,148 B1* | 12/2005 | Bahai | ........... 341/161 |
| 7,292,638 B2* | 11/2007 | McNeely | ..... 375/260 |
| 2002/0175857 A1 | 11/2002 | Abraham | |
| 2003/0112905 A1 | 6/2003 | Heinzl et al. | |
| 2005/0080561 A1* | 4/2005 | Abraham et al. | |

* cited by examiner

Primary Examiner—Dac V Ha

(57) ABSTRACT

In accordance with the present invention, a method of processing a sampled signal stream containing at least one spread spectrum signal is provided together with a receiver, computer, computer-readable storage medium and computer program for the same. The method comprises the steps of processing samples at a first bit level and, either in parallel or subsequently, processing samples at a second bit level, different from the first bit level.

9 Claims, 1 Drawing Sheet

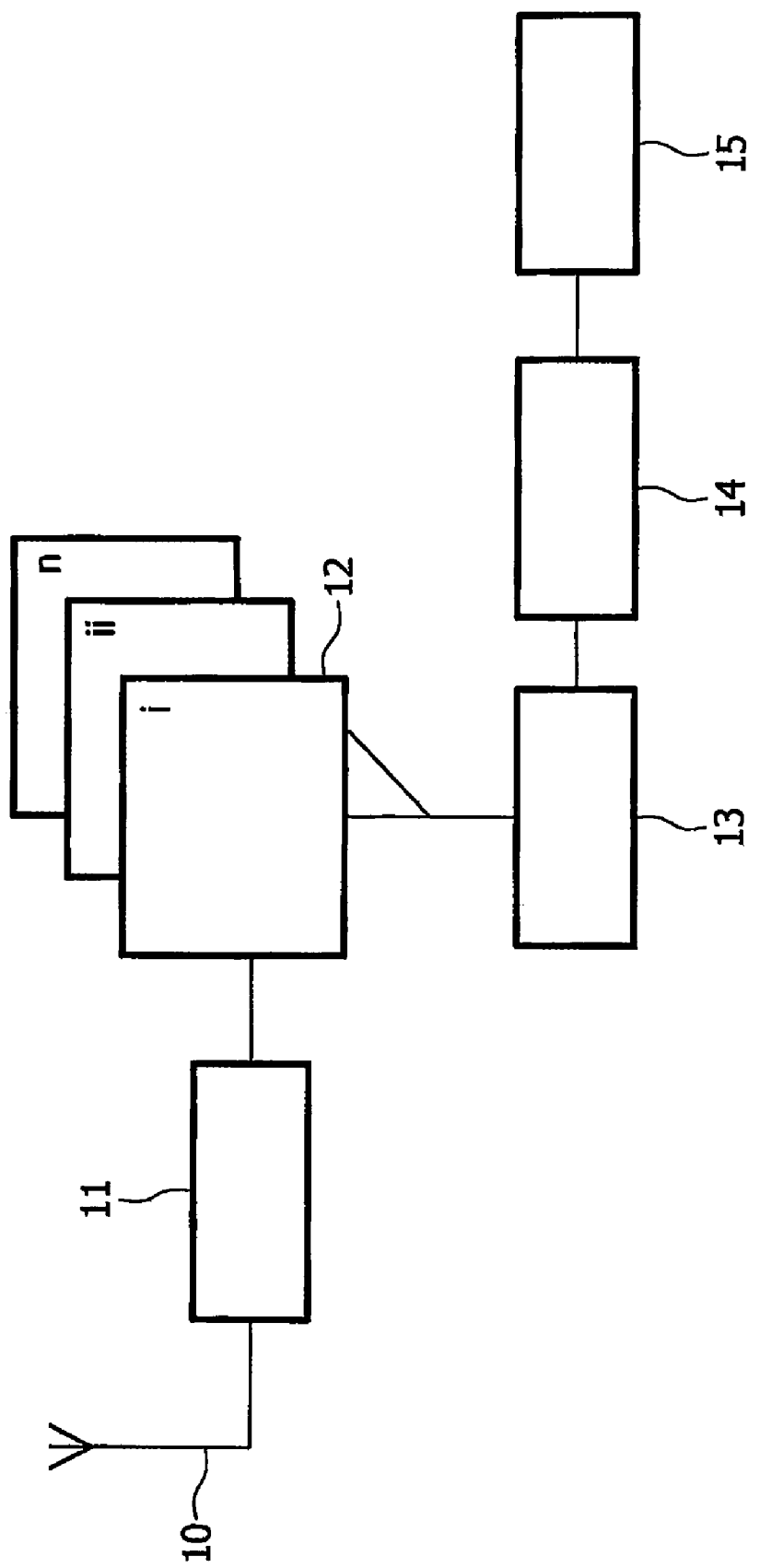

METHOD OF PROCESSING A SAMPLED SPREAD SPECTRUM SIGNAL STREAM

This invention relates to a method of processing a sampled signal stream containing at least one spread spectrum signal together with a receiver, computer, computer-readable storage medium and computer program for the same.

GPS receivers conventionally have a single analog to digital converter (ADC) for sampling GPS received GPS signals at a fixed resolution. Commonly, such ADCs have a 1-bit resolution but as inadvertent narrowband jamming is particularly common, for example, in an indoor environment from mobile phones, PCs and other electrical equipment, some GPS receivers use ADCs having 1.5 or 2 bit resolutions for improved jamming immunity. It has also been suggested in the literature that multi-bit sampling can mitigate multipath distortion which can be encountered when attempting to measure GPS pseudorange in a urban environment, i.e. when GPS signals take an indirect route to a GPS receiver having been reflected by nearby buildings.

As GPS signals experience a high degree of signal attenuation from the GPS satellite to the Earth's surface, the computation burden of acquiring sampled GPS signals at even 1 bit resolution is massive. The computational burden of acquiring such signals at 1.5 and 2 bit resolutions is even higher. Hence, there is a trade off between performance in respect of jamming and multipath and computational cost.

In accordance with the present invention, a method of processing a sampled signal stream containing at least one spread spectrum signal is provided together with a receiver, computer, computer-readable storage medium and computer program for the same. The method comprises the steps of processing samples at a first bit level and, either in parallel or subsequently, processing samples at a second bit level, different from the first bit level.

The signal stream may be sampled at a higher bit level than at least one of the first or second bit levels wherein the samples are processed at one of either the first or second bit levels by selectively ignoring bits of the signal samples. Alternatively, the signal stream may be sampled at a varying bit level of either first or second bit levels corresponding to the bit level at which those samples will be processed.

The samples may be processed in parallel at first and second bit levels for the purposes of acquiring either respective spread spectrum signals or the same spread spectrum signal.

A change from processing the samples at the first bit level to the second bit level may occur upon experiencing difficulty acquiring a spread spectrum signal.

If the signal stream contains a GPS spread spectrum signal, the step of processing samples at a first bit level may be used to acquire the GPS signal and the step of processing samples at a second bit level may be used to measure a pseudorange from the GPS signal.

The present invention will now be described, by way of example only, with reference to the accompanying schematic drawing showing a GPS receiver in accordance with the present invention.

It is well known to provide a GPS receiver in which replica GPS satellite pseudorandom noise (PRN) code signals are continuous generated and correlated with received GPS signals in order to acquire them. Typically, as the replica codes are likely to have a different code phase to those of the received GPS signals and also a different frequency due to Doppler shift between the receiver and orbiting satellites, a two dimensional code frequency/phase sweep is employed whereby such a sweep will eventually result in the incoming PRN code having the same frequency and code phase as that of the locally generated replica. If detected, the code is acquired and tracked, and the pseudorange information may be retrieved from which the position of the receiver may be calculated using conventional navigation algorithms.

Referring to the accompanying drawing, a GPS receiver is shown in which NAVSTAR GPS SPS signals are received by an antenna 10 and pre-processed in a pre-processor 11 including passive bandpass filtering in order to minimise out-of-band RF interference, preamplification, down converting to an intermediate frequency (IF) and analog to digital conversion. The resultant, digitised IF signal remains modulated, still containing all the information from the available satellites, and is fed into each of twelve parallel receiver channels 12 (not all channels shown). The satellite signals are acquired and tracked in respective digital receiver channels in co-operation with the receiver processor 13 for the purpose of retrieving the 30 second GPS ephemeris data message and measuring pseudoranges from each satellite. Such methods for acquisition and tracking are well known, for example, see chapter 4 (GPS satellite signal characteristics) & chapter 5 (GPS satellite signal acquisition and tracking), Kaplan ibid.

Using the GPS pseudoranges, acquired navigation information and the time of arrival of the transmissions, the navigation processor 14 calculates the position of the receiver using conventional algorithms and that position is displayed on a display 15 to the user. The pre-processor 11 will be typically implemented in the form of front end analogue circuitry with the digital receiver channels 12, the receiver processor 13 and the navigation processor 14 implemented in the form of a general purpose microprocessor or a microprocessor embedded in a GPS application specific integrated circuit (ASIC).

In accordance with the present invention, the analog to digital conversion and the acquisition and tracked of the digitised signal in the digital receiver channels may be done as described in either of the following example scenarios:

EXAMPLE 1

When operating in a urban environment, the GPS receiver uses real-time 1-bit sampling and processing in the digital receiver channels to acquire 3 of the 4 GPS signals necessary to determine a position fix. In order to acquire a $4^{th}$ GPS signal, the ADC switches to real-time 2-bit sampling and processing in the digital receiver channels. The improved signal acquisition performance enables a $4^{th}$ GPS signal to be acquired. Thereafter, pseudoranges from the 4 acquired GPS signals are measured to determine a position fix.

EXAMPLE 2

A snapshot of 1 s of GPS signal data is sampled at 2-bit quantization (sign and magnitude bits representing −2, −1, 1, 2) and stored. Thereafter, the snapshot is repetitively subjected to 1 bit processing of the sign bit only in the digital receiver to acquired 4 GPS signals. Once the 4 GPS signals are acquired, the snapshot is subjected to 2 bit processing in the digital receiver channels to measure the 4 GPS pseudoranges necessary to determine a position fix.

From a reading of the present disclosure, other modifications will be apparent to the skilled person skilled and may involve other features which are already known in the design, manufacture and use of spread spectrum signal receivers, including GPS receivers, and component parts thereof and which may be used instead of or in addition to features already described herein.

The invention claimed is:

1. A method of processing a sampled signal stream containing at least one spread spectrum signal in a Global Positioning System (GPS) receiver comprising the steps of processing samples at a first bit level using an analog-to-digital converter (ADC) and, either in parallel or subsequently, processing samples at a second bit level, different from the first bit level, wherein the signal stream contains a GPS spread spectrum signal; wherein the step of processing samples at a first bit level is used to acquire the GPS signal; and wherein the step of processing samples at a second bit level is used to measure a pseudorange from the GPS signal.

2. A method according to claim 1 wherein a change from processing the samples at the first bit level to the second bit level occurs upon experiencing difficulty acquiring a spread spectrum signal.

3. A method according to claim 1 wherein the signal stream is sampled at a higher bit level than at least one of the first and second bit levels; and wherein the samples are processed at one of the first and second bit levels by selectively ignoring bits of the signal samples.

4. A method according to claim 1 wherein the signal stream is sampled at a varying bit level of either first or second bit levels corresponding to the bit level at which those samples will be processed.

5. A method according to claim 1 wherein the samples are processed in parallel at first and second bit levels for the purposes of acquiring respective spread spectrum signals.

6. A method according to claim 1 wherein the samples are processed in parallel at first and second bit levels for the purposes of acquiring the same spread spectrum signal.

7. A receiver configured to receive and sample a signal containing at least one spread spectrum signal, and to process that signal by a method according to claim 1.

8. A computer configured to receive a sampled signal containing at least one spread spectrum signal from an external receiver, and to process that signal by a method according to claim 1.

9. A computer-readable storage medium having recorded thereon a computer program comprising instructions for performing a method according to claim 1.

* * * * *